(12) United States Patent
Stevenson

(10) Patent No.: US 6,364,591 B1
(45) Date of Patent: Apr. 2, 2002

(54) STACK WAGON FOR HANDLING BIG AND SMALL BALES AND METHOD OF CONVERTING SMALL BALE WAGON TO HANDLE LARGE BALES

(75) Inventor: Lynn E. Stevenson, Fairfield, ID (US)

(73) Assignee: Arrowhead Manufacturing, Inc., Fairfield, ID (US)

( * ) Notice: Subject to any disclaimer, the term of this patent is extended or adjusted under 35 U.S.C. 154(b) by 0 days.

(21) Appl. No.: 09/482,975

(22) Filed: Jan. 12, 2000

Related U.S. Application Data

(63) Continuation-in-part of application No. 08/753,875, filed on Dec. 2, 1996, now Pat. No. 6,024,534.

(51) Int. Cl.⁷ .............................................. A01D 87/12
(52) U.S. Cl. ..................... 414/25; 414/111; 414/503; 414/786; 414/789.7
(58) Field of Search .............................. 414/789.7, 503, 414/504, 505, 509, 24.5, 800, 111, 555, 786

(56) References Cited

U.S. PATENT DOCUMENTS

| | | | | |
|---|---|---|---|---|
| 4,498,829 A | * | 2/1985 | Spikes | 414/24.5 |
| 4,952,111 A | * | 8/1990 | Callahan | 411/111 |
| 5,397,208 A | * | 3/1995 | Siebenga | 411/111 |
| 5,405,229 A | * | 4/1995 | Tilley et al. | 414/789.7 |
| 5,695,311 A | * | 12/1997 | Miguel et al. | 414/786 |
| 5,697,758 A | * | 12/1997 | Tilley et al. | 414/786 |
| 5,758,481 A | * | 6/1998 | Fry | 56/474 |
| 5,846,046 A | * | 12/1998 | Warbulton | 414/552 |
| 5,921,734 A | * | 7/1999 | Rempel | 414/555 |
| 5,975,824 A | * | 11/1999 | Hostetler | 414/24.5 |
| 5,997,233 A | * | 12/1999 | Whatley et al. | 414/25 |
| 6,024,534 A | * | 2/2000 | Stevenson | 414/800 |
| 6,048,160 A | * | 4/2000 | Resist et al. | 414/555 |
| 6,171,046 B1 | * | 1/2001 | Nutcher | 414/24.5 |
| 6,171,047 B1 | * | 1/2001 | Vandervalk | 414/24.5 |

* cited by examiner

*Primary Examiner*—Joseph A. Fischetti
(74) *Attorney, Agent, or Firm*—Frank J. Dykas; Robert L. Shaver; Stephen M. Nipper

(57) ABSTRACT

Apparatus for modifying conventional automatic three table bale wagons handling small bales to load, transport, and stack big bales with dimensions in excess of 3 feet×4 feet ×8 feet. With the apparatus a modified bale wagon picks up and handles big bales during traversal of a field in which big bales of vegetative material have been deposited. The modified bale wagon with its apparatus loads the big bales one at a time and orders them without rotation, two at a time, on a loading table of a conventional three table automatic bale wagon which pivots vertically, placing the two big bales on end on the bale wagon load bed side-by-side in the bale wagon load bed. When the load bed reaches capacity, six to eight big bales, the bale wagon is driven to a storage area where the load bed pivots 90°, allowing the big bales to be pushed off the load bed, forming a compact stack of six to eight big bales.

10 Claims, 10 Drawing Sheets

STACK WAGON FOR HANDLING BIG AND SMALL BALES AND METHOD OF CONVERTING SMALL BALE WAGON TO HANDLE LARGE BALES

DESCRIPTION

This application is a Continuation-in-part of application Ser. No. 08/753,875 filed Dec. 2, 1996, now U.S. Pat. No. 6,024,534 entitled Method to Convert a Small Bale Agricultural Stack Wagon to a Big Bale Agricultural Stack Wagon.

BACKGROUND OF THE INVENTION

1. Field of the Invention

This invention relates to bale stack wagons, and more particularly to a method to convert a small bale agricultural stack wagon to big bale agricultural stack wagon, and to a stack wagon which converts for handling either large bales or small bales.

2. Background of the Invention

One conventional automatic three table bale wagon which received widespread commercial acceptance is the three table bale wagon illustrated in U.S. Pat. No. 2,848,127, issued on Aug. 19, 1958 in the name of Gordon E. Grey. Other bale wagons of the same general type utilizing varying approaches to the same problem are shown in U.S. Pat. No. 4,370,796, issued Feb. 1, 1983, in the name of Leon W. Wilson; U.S. Pat. No. 4,273,488, issued in the name of Amos G. Hill, et al.; and U.S. Pat. No. 3,942,651, issued Mar. 9, 1976 in the name of Allen B. Neely, Jr. The improvements in conventional automatic three table bale wagons are illustrated, for example, in U.S. Pat. No. 3,395,814, issued Aug. 6, 1968, in the name of Gordon E. Grey; U.S. Pat. No. 3,942,652, issued Mar. 8, 1976 in the name of L. Dennis Buller, et al.; U.S. Pat. No. 3,927,771, issued Dec. 23, 1975 in the name of Lee D. Buller, et al.; U.S. Pat. No. 4,203,695, issued May 20, 1980 in the name of Edward J. Wynn, et al.; U.S. Pat. No. 4,204,792, issued May 27, 1980 in the name of Edward J. Wynn, et al.; U.S. Pat. No. 4,088,231, issued May 9, 1978 in the name of Randall E. Zpser, et al.; and U.S. Pat. No. 5,547,334, issued Aug. 20, 1996 in the name of Albert F. Baril. The conventional automatic three table bale wagons all load, handle, transport and stack small bales ranging in size from 14"×23"×36" to 16"×18"×46", depending on moisture content and type of vegetative material.

One conventional automatic three table bale wagon which has achieved widespread commercial acceptance, is the three table wagon illustrated in U.S. Pat. No. 2,848,127 issued on Aug. 19, 1958, in the name of Gordon Grey. Other such bale wagons of the same general type utilizing varying approaches to the same problem are shown in U.S. Pat. No. 4,370,796, issued Jun. 16, 1981, in the name of Amos G. Hill, et al., U.S. Pat. No. 3,942,651, issued Mar. 9, 1976, in the name of Allen B. Neely, Jr., and U.S. Pat. No. 5,547,334 issued Aug. 14, 1995, in the name of Albert F. Baril. The conventional automatic three table bale wagons (hereinafter collectively referred to as "bale wagon") are either self-propelled or drawn by a vehicle.

Recent developments in the field of agriculture have resulted in the use of balers to form big bales in the order of 3 feet×4 feet×8 feet or 4 feet×4 feet×8 feet, weighing between 1,000 lbs. and 2,200 lbs. (hereinafter "big bale") depending on the moisture content and type of vegetative material. The big bales are considered a more efficient and economical way of handling cut hay and straw. One big bale is equal in weight to 16 to 24 small bales. Big bales produce a more compact, weather-tight stack than do conventional bales. Big bales also make more efficient and compact loads when shipping. The big bales require less twine or baling wire than do a comparable volume of conventional bales.

Despite the efficiency of using big bales in agriculture, the cost of acquiring a big bale wagon to handle big bales such as illustrated and described in U.S. Pat. No. 4,534,691, issued Aug. 13, 1965, in the name of Marvin E. Miguel assigned to J.A. Freeman & Sons, is substantial. The present invention allows small bale wagons like the Grey type, including the self-propelled conventional automatic three table bale wagon, for example, including New Holland automatic self-propelled small bale stack wagons to be converted into a big bale wagon at a fraction of the cost of a new big bale wagon like the Freeman bale wagon.

A general object of the invention is to provide a method to convert a small bale stack wagon into a stack wagon which may be operated by a single person and which will load, order and off-load big bales of hay.

Another object of the instant invention is to provide an apparatus for use with a small bale wagon which will arrange big bales of hay in a compact, weather-tight stack.

A further object of the instant invention is to provide an apparatus to mount on a bale wagon which will arrange big bales of hay in a stable stack.

A further object of the instant invention involves mounting the apparatus onto conventional automatic bale wagons manufactured by New Holland North America, Inc., New Holland having a hauling capacity of at least five (5) tons to load, transport and stack big bales.

Another object of the invention is to provide a bale wagon which can be converted to handle either small or large bales.

SUMMARY

Various other objects and advantages which are attained by the invention will become more fully apparent as the description which follows is read in conjunction with the accompanying drawings.

The above-mentioned Grey type bale wagon has a first table for receiving bales from a bale loader or pickup assembly (hereinafter referred to as "first table"). The bales are picked up from the ground by a short chute, which lifts them to a first table mounted transverse behind the cab. The first table accumulates a predetermined number of bales, typically two, in a transverse row. An adjacent second table successively receives rows of bales from the first table and accumulates a plurality of such rows, for example four, five or six rows, in a horizontal layer or tier. This plurality of rows is commonly referred to as a tier of bales. The third table, or load bed, successively receives the tiers from the second table and accumulates a plurality of such tiers, for example seven, held vertically to form a stack of bales in a block shaped configuration. Once a stack of this nature has been formed on the load bed, it may be either tansported or unloaded to the ground. In the case of the latter, the load bed is pivoted to an upright position for depositing the stack on the ground with the first tier of bales that was formed on the second table becoming the lowermost tier in contact with the ground and the last formed tier being the uppermost or top tier of the stack.

The invention involves removing the small bale lifting chute, and installing a conveyor for lifting the large bales. The conveyor bypasses the first table, which is deactivated or removed. The second table is also modified to handle and form a tier of big bales. The modification is to cover the second table surface with a reinforcing surface, which also has a big bale pusher blade enclosed in a protective housing. Extra hydraulic cylinders are added to lift the bales from the second table to the load bed, and the L-shaped arms of the second table are reinforced. This process can be easily reversed, so that one bale stacker can be used to handle either large or small bales.

DESCRIPTION OF THE PREFERRED EMBODIMENT

One preferred embodiment of the instant invention is a method to reversibly modify a small bale stack wagon to enable it to load, handle, transport, and stack big bales. After this modification, one person can pick up a big bale in the field, load it onto the bale wagon, form a stack of big bales, transport the big bales to a stacking site, and unload six to eight big bales comprising up to six tons of hay. By reversing the modifications, small bales can be managed using the same machine.

By way of explanation to understand the preferred embodiment of the invention, the first part is a description of the function of the prior art of a small bale stack wagon.

Figure 1:
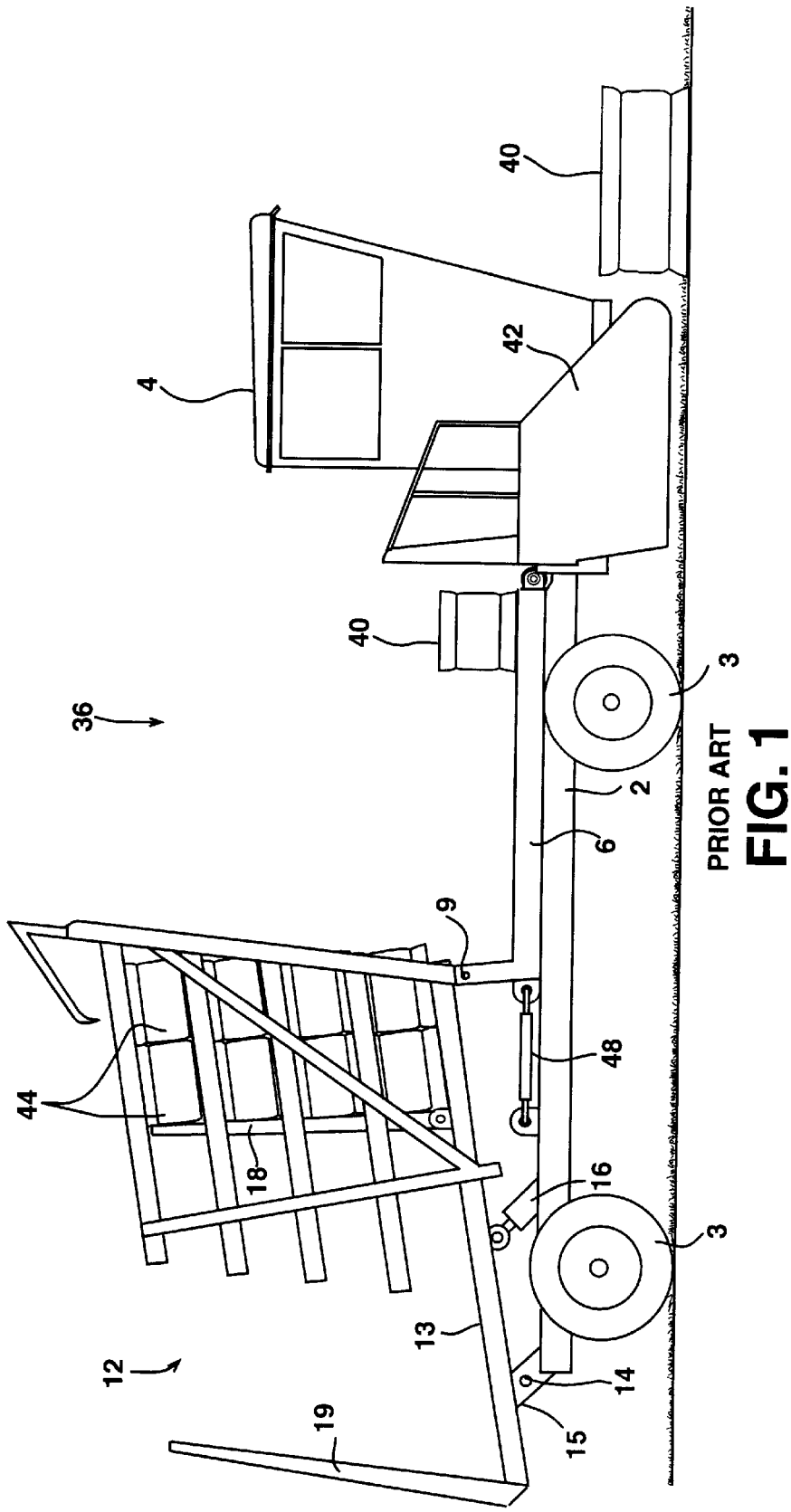
FIG. 1 is a side view of a prior art three table small bale stack wagon.

Three table, small bale stack wagons, as shown in FIG. 1 (hereinafter in this section "three table small bale stack wagon") and designated 36 have a mobile chassis formed of left and right longitudinally extending channels 2 (only the right channel being shown), suitably interconnected by spaced transverse channels 17, and front and rear pairs of wheels 3, only right wheels of each pair being shown in FIG. 1, for movably supporting the interconnected channels 2. On the forward ends of the channels 2 is mounted a cab 4 for housing the operator and various controls for the wagon. A source of power, such as an engine, is suitable mounted on the chassis for driving, preferably, the rear pair of wheels 3.

The above-mentioned small bale stack wagon 36 has a first table 38 for receiving small bales 40 from a bale loader or first bale lifting means 42, and accumulates a predetermined number of small bales 40. An adjacent second table 6 successively receives rows of bales 40 from the first table 38 and accumulates a plurality of rows into a tier 44. The third table 12, or load bed, successively receives tiers 44 of small bales 40 from the second table 6 to form a stack of bales 46.

Figure 2:
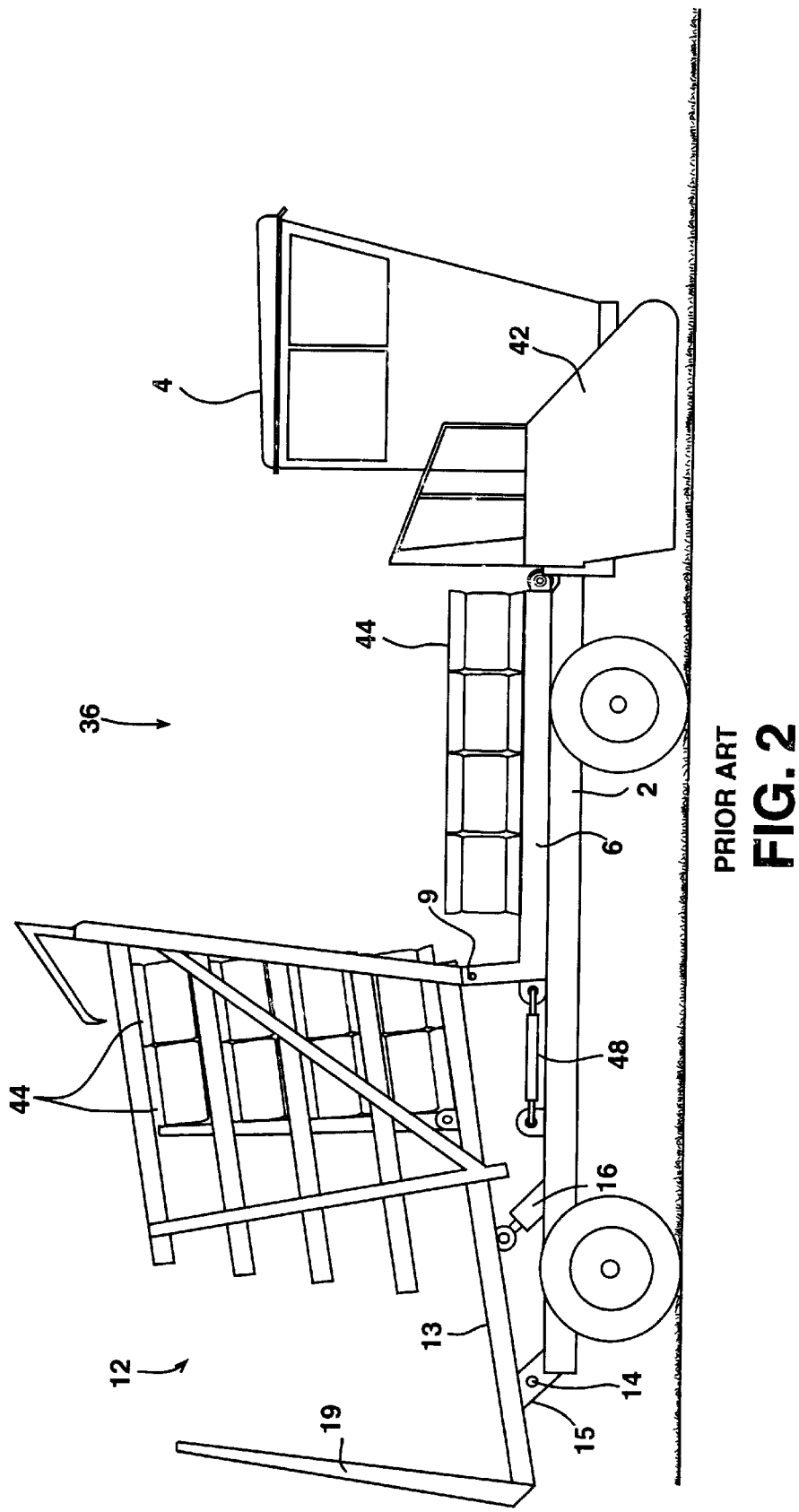
FIG. 2 is a side view of a prior art stack wagon with a tier of bales formed on the second table.
Figure 7:
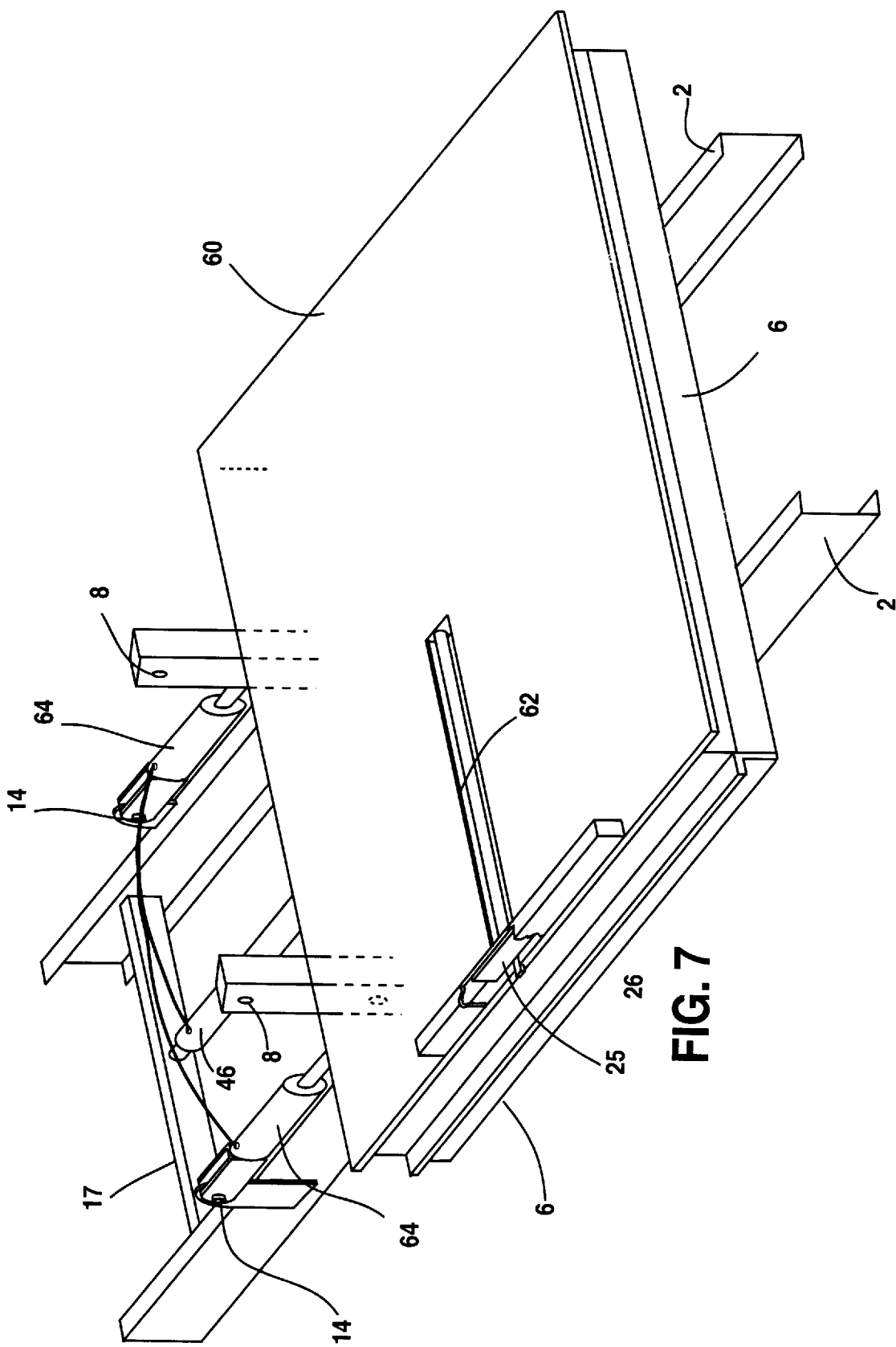
FIG. 7 perspective view of a second table modified for big bales.

An L-shaped member 8 is attached to second table 6. The L-shaped member 8 has a forwardly extending leg portion 7 which extends across the bottom surface of the second table 6. Second table 6 is a generally rectangular surface attached to L-shaped member 8. Second table 6 is held in a generally horizontal position as shown in FIGS. 1 and 2, as it receives tiers 44 of bales 40 from first table 38. A hydraulic cylinder 48 is pivotally secured at its anchor end 19 to a transverse channel 17, as shown in FIG. 7. The rod end of hydraulic cylinders 48, is pivotally secured to the free end of second table 6.

Figure 3:
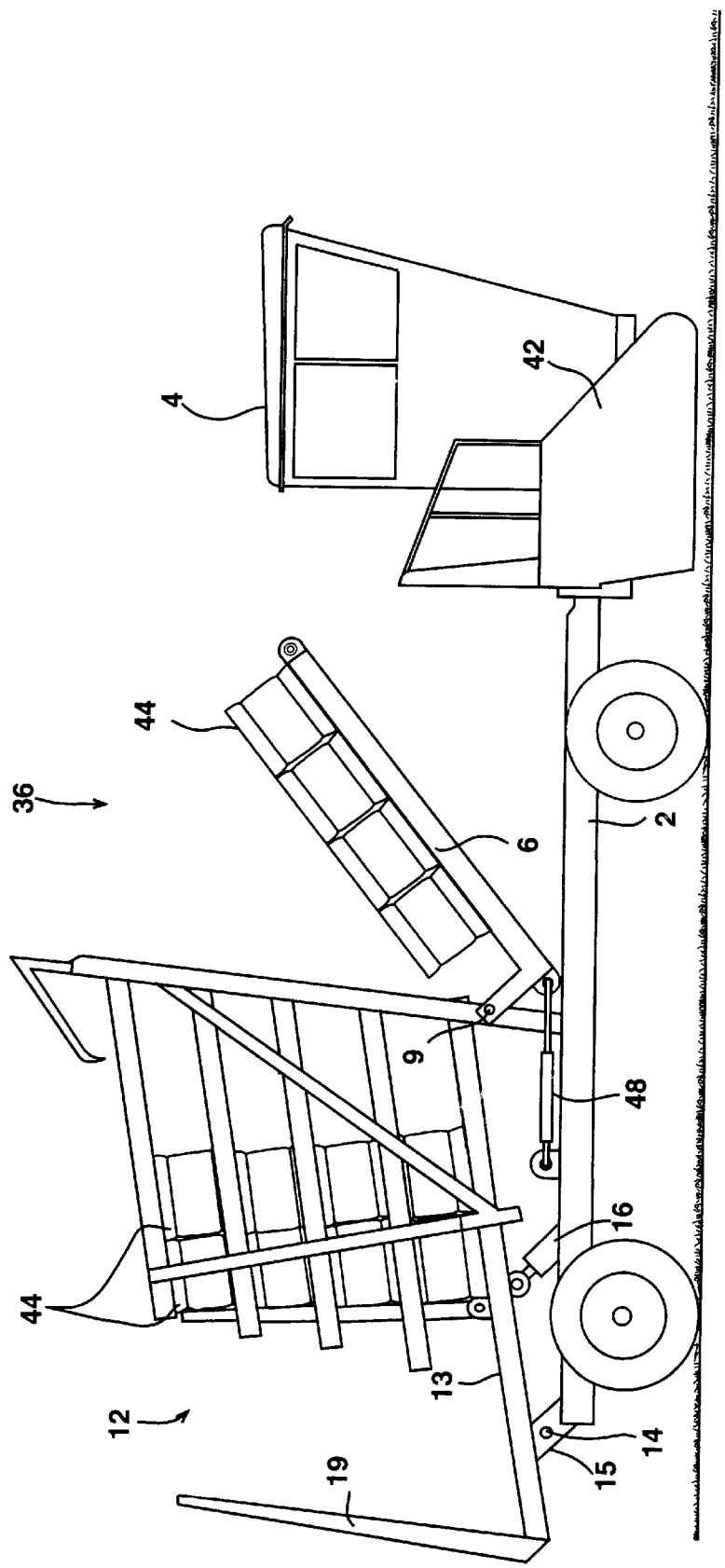
FIG. 3 is a side view of a prior art stack wagon with a tier of bales being raised on the second table.

When second table 6 is in its normal horizontal tier-forming position, as shown in FIGS. 1 and 2, it rests at its forward end on a transverse support member, not shown. The requisite number of bales are accumulated and formed on second table 6 in a suitable manner. Subsequent to tier formation, the hydraulic cylinder 48 is actuated so that it extends and causes said table 6, to swing upwardly about pivot point 9 to a generally vertical position adjacent the front end of a rearwardly disposed load bed 12, as shown in FIG. 3. The tier 44 of bales formed on second table 6 is then transferred to load bed 12.

Load bed 12 includes a platform assembly 13 which is pivotally mounted at 14 between spaced apart upstanding rear brackets 15 (only the right one being shown in FIG.3) mounted on longitudinal chassis channels 2. A pair of spaced apart hydraulic cylinders 16 (only the right one being shown) are pivotally secured at their anchor ends to transverse frame member 17 fixed between channels 2 and at their rod ends to platform assembly 13. When load bed 12 is in its generally horizontal tier-receiving position, it rests at its forward end on upstanding brackets. A stack of bales 46 is formed on load bed 12 upon successive delivery thereto of tiers 44 of bales 40 by pivotal movement of second table 6 from its normal horizontal tier-forming position of FIGS. 1 and 2 to its generally upright position, shown in FIG. 3, adjacent the forward end of load bed 12.

As the tiers of bales are delivered to load bed 12, a rolling rack 18 supports the rear of the stack 46 being formed. Rolling rack 18 moves rearwardly along the load bed 12 against residual holding pressure of a hydraulic cylinder. While rolling rack 18 is held by hydraulic pressure at the position to which it has been moved along load bed 12, the pressure of the rolling rack cylinder is overcome with the delivery of each successive tier 44 of bales 40 from second table 6 to the front end of load bed 12 whereby rolling rack 18 is urged rearwardly one bale width at a time until rack 18 reaches its rear position. A desired number of tiers for forming a stack configuration dictates the rear position of load bed 12. The structure and function of rolling rack 18 and its hydraulic cylinder are illustrated and described in detail in U.S. Pat. No. 3,927,771.

Figure 4:
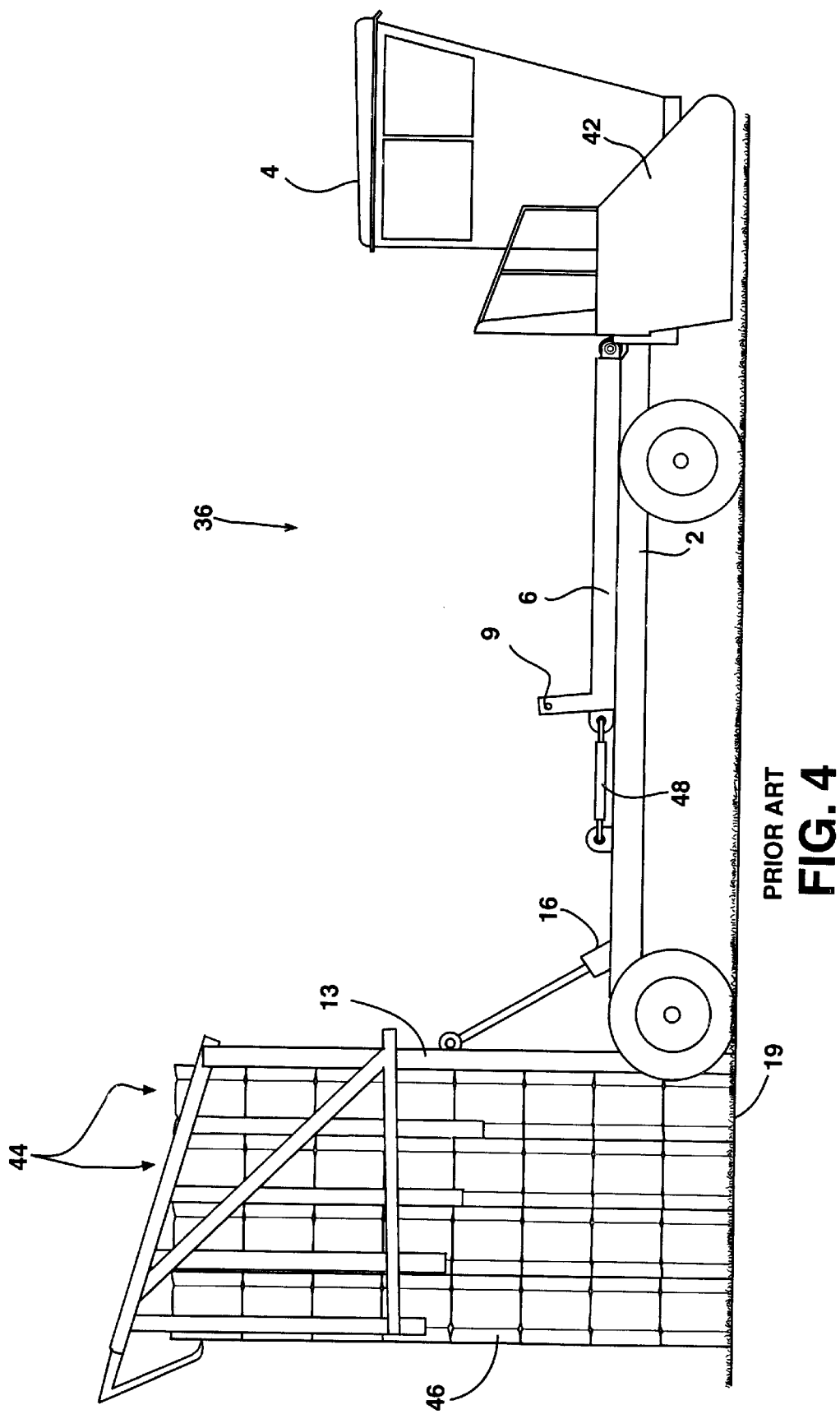
FIG. 4 is a side view of a prior art stack wagon with eight tiers of bales held on the load bed.
Figure 5:
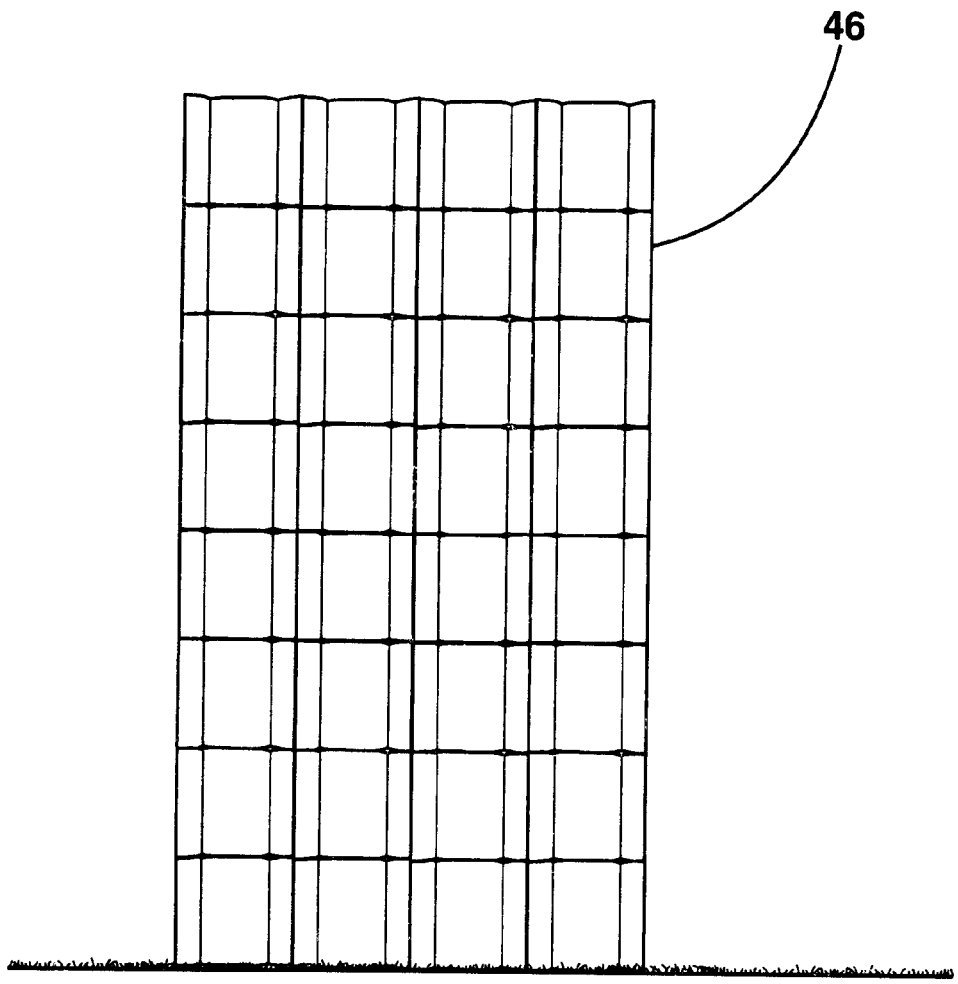
FIG. 5 is a side view of a prior art stack wagon with a full stack of bales set on the ground.

When load bed 12 has been loaded with a desired number of tiers 44, stack transfer is initiated by extension of hydraulic cylinders 16, as shown in FIG. 4. This causes load bed 12 to pivot about point 14 from its generally horizontal position of FIG.1, to an upright position of FIG. 4, in which rolling rack 18 and upright support tines 19 are disposed adjacent the ground. The present invention utilizes the prior art three table, small bale wagon as part of a system for handling either small bales or large bales. To configure this system for handling large bales, first bale lifting means 42 is removed from the small bale wagon 36. The first table 38 may be removed, moved to a vertical position, or simply bypassed.

Next a conveyor 5 is added to the small bale wagon 36. Conveyor 5 includes a means for hydraulically raising the forward end of the conveyor 5 when the vehicle 36 is operated on a highway or at any time when the vehicle 36 is operated at a speed greater than that which is used for picking up bales out of a field. The entire conveyor 5 pivots at the rearward mounting member 20. The forward end of the conveyor, when in the lowered position, rests on a pair of pneumatic wheels 52 which keep the front of the conveyor 5 from digging into the ground and at the proper height to receive big bales 54. A hydraulic motor and a shaft mounted gearbox provide power for the chains of the conveyor, which in the preferred embodiment comprise two chains. Plural U-shaped dogs (not shown) are fixed to the chain conveyors for picking up and transporting a bale from a position on the ground to the second table 6. The forward shaft of the chain conveyor 5 has steel paddles attached parallel to the shaft so that upon engagement the bale is lifted on to the conveyor 5. The aft end of conveyor 5 and the hydraulic motor which powers it (not shown) are supported by a welded tubular steel frame 56 that is bolted to the chassis channels 2 of the stack wagon 36.

FIGS. 6 through 10 show a bale wagon 36 converted to handle big bales.

Figure 6:
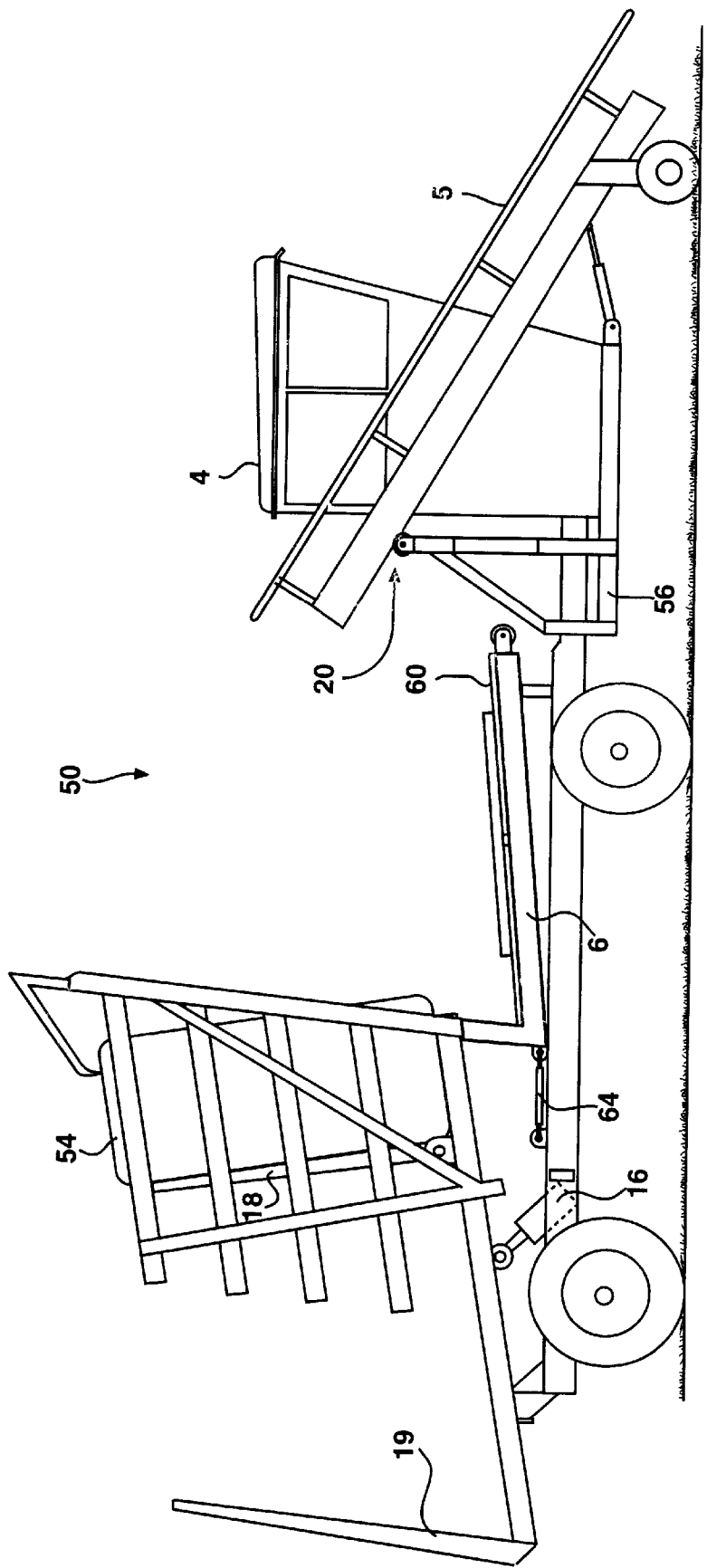
FIG. 6 is a side view of a stack wagon of the invention configured for big bales.

FIG. 6 shows the invention configured for receiving big bales. Big bales are bales which are 3 feet by 4 feet by 8 feet (3'×4'×8') in dimension, and they may also be four feet by four feet by 8 feet (4'×4'×8'). The big bale stack wagon 50 which is shown in FIG. 6 is part of a bale wagon system. This system is configurable to receive, handle, transport and stack either small bales or large bales. When configured for handling small bales, it appears as shown in FIG. 1. When configured for handling large bales, it appears as shown in FIG. 6. Once configured as shown in FIG. 6, the system can easily be reconfigured back to handling small bales. The invention includes a bale wagon 50 with a wheel chassis for support and transport of bales. It also includes a first bale lifting means 42, which is mounted on the forward end of the chassis of the bale wagon 50, and has a receiving and a discharge end. The receiving end of the first lifting means is typically positioned when in an operating position, near the ground level and facing forward in direction of travel up the bale wagon 50. The discharge end is adjacent the first table 38 on the wagon chassis. The first lifting means lifts a small bale 40 and turns it to a vertical position. From the vertical, the small bale 40 falls over onto the first table 38, which arranges the bales into a row, typically of two bales. This is shown in FIGS. 1 through 4.

The bale wagon system also includes a second lifting means 58, which also has a receiving and a discharge end. The second lifting means is also mounted on the forward end of the chassis of the bale wagon, and is also configured so that the receiving end is positionable near the ground level and facing in the direction of travel. A preferred second lifting means is a conveyor 5. The discharge end is adjacent to the second table 6 on the bale wagon 50.

The next step in converting to handling big bales is to mount to the top of the second table in bale wagon 50 a big bale loading table 60 of sufficient size and stiffness to handle big bales 54. The loading table comprises a floor, forward and rear ends, and opposed sides. The loading table is affixed to said second table 6 and moves in concert with the second table 6, whereby the loading table orders and forms the tiers of big bales in pairs. The loading table 60 also serves to reinforce second table 6.

Mounted to the loading table 60 is a hydraulic mechanism having the means to move a big bale deposited on the loading table 60 from the right side to the left side of the loading table 60. The hydraulic mechanism comprises a hydraulic cylinder (not shown) and has a rod of sufficient size to reach to the right side loading table 6. The hydraulic cylinder barrel is mounted at the midpoint of and perpendicular to the left side of the loading table. The hydraulic cylinder rod is of sufficient length to reach the right side of said loading table. Attached to the end of the hydraulic rod is a steel plate or bale pushing blade 25 of sufficient size to pull a big bale across the loading table ordering the left side of said big bale parallel to the left side of the loading table. This blade is housed in a steel channel to protect it from the bales as they are loaded on the second table. A portion of an inside wall and bottom of the channel are removed to allow the blade to move in and out of the protective channel.

The floor of the loading table 60 contains a rectangular opening 62 of predetermined length and breadth to accommodate the retraction and extension of said hydraulic rod with bale pushing blade 25. The rectangular opening 62 is a recessed channel in the loading table 60 floor with said channel having opposing sides and a floor of predetermined length and breadth.

The loading table 60 pivots 90° from a horizontal resting position as shown in FIG. 6, to a vertical position to load a tier of bales into the load bed 12. To accommodate the weight of big bales, one or more supplemental hydraulic cylinders 64 are pivotally attached to the L-shaped members 8 supporting the second table 6 and to the top of and parallel to the chassis 2 of the bale wagon 50, preferably with one hydraulic cylinder attached to each chassis frame member 2.

Figure 8:
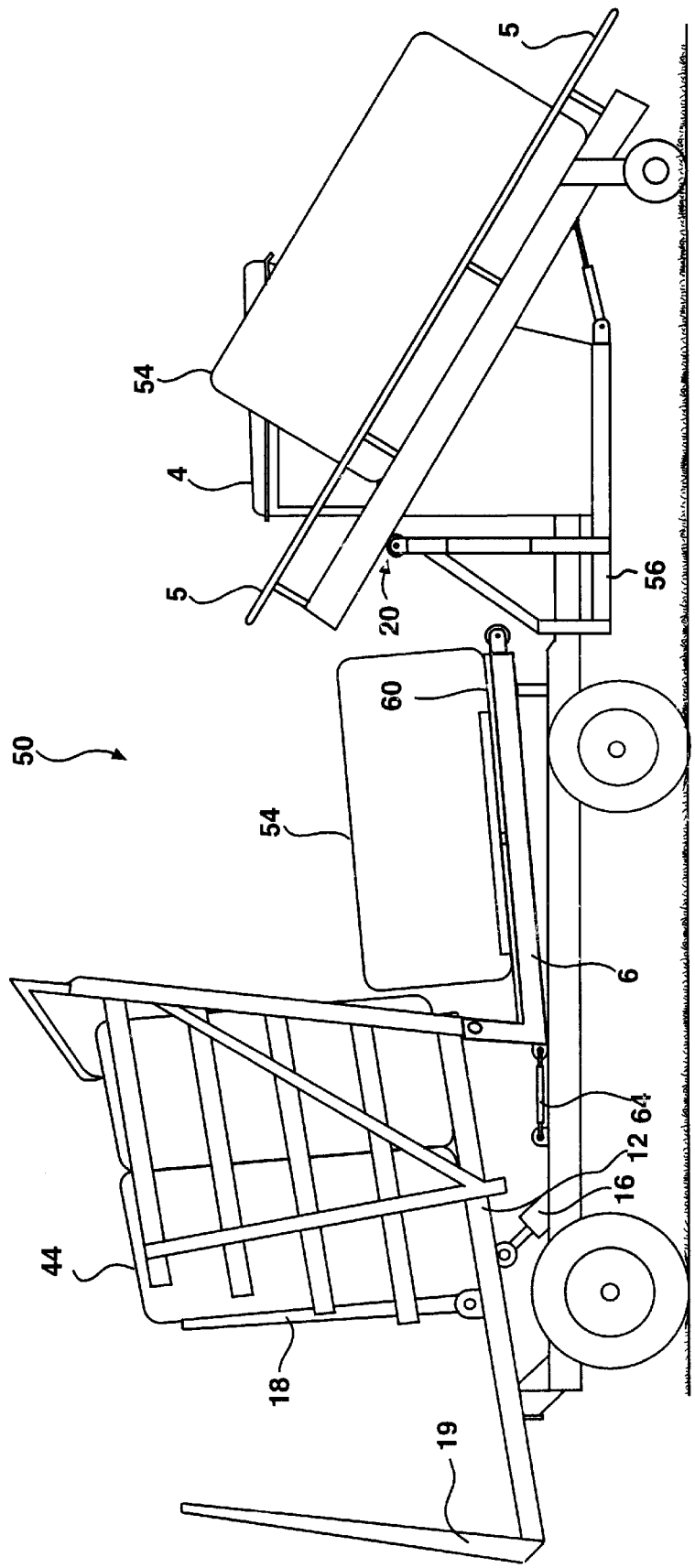
FIG. 8 is a side view of a big bale wagon of the invention with bales on the second table and load bed and conveyor.
Figure 9:
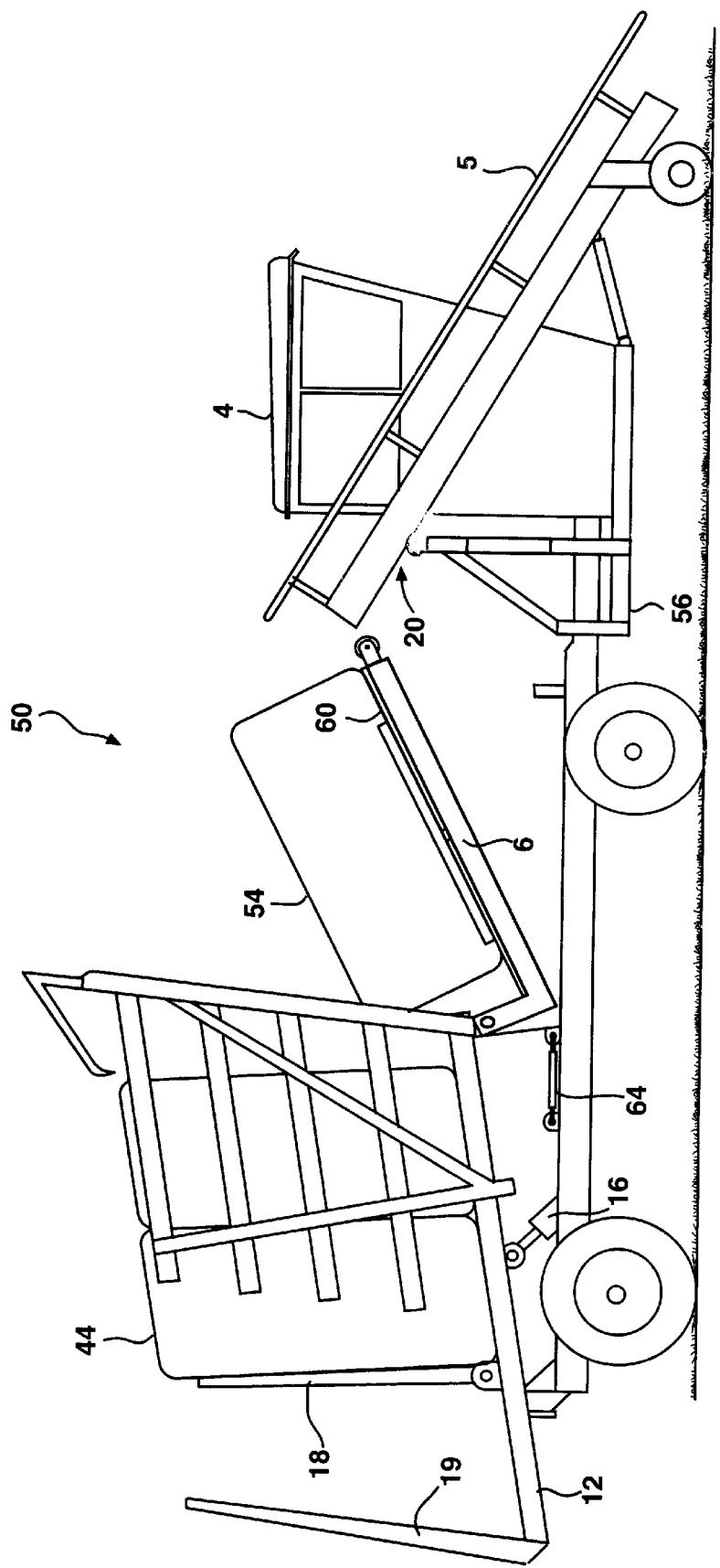
FIG. 9 is a side view of a big bale wagon of the invention with two bales being lifted onto the load bed.
Figure 10:
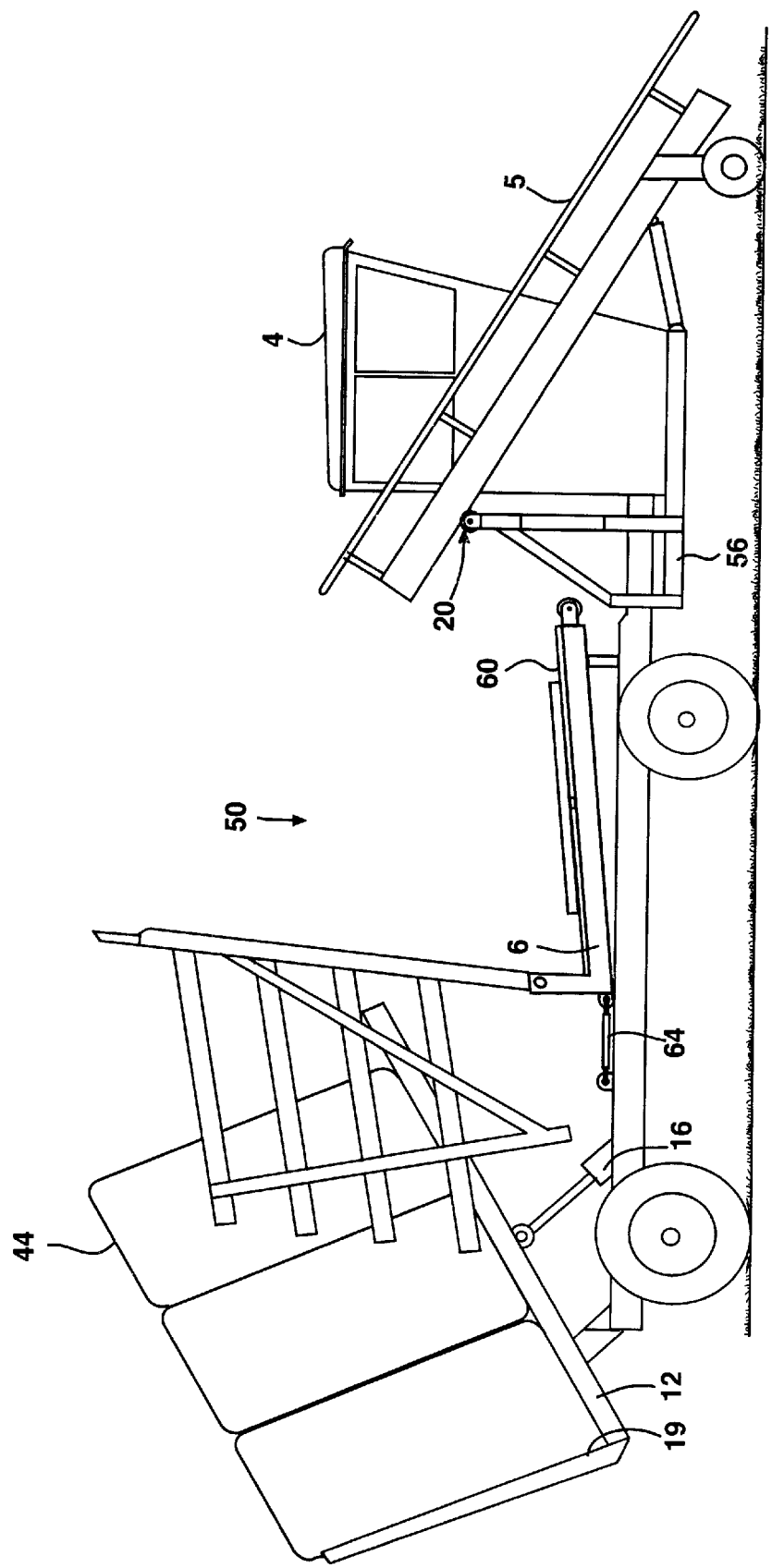
FIG. 10 is a side view of a big bale wagon of the invention with bales held on the load bed.

By the use of these additions, two big bales 54 may be raised on to load bed. The big bale 54 is initially deposited on the right side of loading table 60. Bale pushing blade 25 is activated, and pushes the first big bale 54 to the left side of loading table 60. When an additional big bale 54 is deposited on loading table 60, one tier 44 is thus formed. At that time, the hydraulic cylinders 64 and 48 are activated, to rotate the second table 6 into a vertical position. These steps are shown in FIGS. 6, 8, and 9. FIG. 10 shows forward tiers 44 of big bales 54 formed on to the third table, or load bed 12. From the position shown in FIG. 10, load bed 12 is rotated to a vertical position, and the bale wagon 50 can drive away from the stack of bales 46 and leave the stack on the ground.

These steps can be reversed, and the big bale load wagon can be modified to once again handle small bales.

Thus, while the preferred apparatus and method in which the principles of the present invention are readily carried out is shown and described above, it is to be understood that the invention is not to be limited to the particular apparatus shown and described above, but, in fact, widely different means may be employed in the practice of this invention.

What is claimed is:

1. A bale wagon system configured to load, transport and stack hay bales, said bale wagon system comprising:

a. a three table bale wagon with a removable first table, a second table, and a load bed, and a wheeled chassis with a forward and a rearward end and a longitudinal axis, for support and transport of bales;

b. a removable first lifting means with a conveyor, a receiving and a discharge end, mountable on said forward end of said wheeled chassis of said three table bale wagon, and with said receiving end of said conveyor positionable near ground level in a direction of travel, and with the discharge end at said removable first table on said wheeled chassis, configured for contacting and lifting hay bales which are less than 3 feet by 3 feet by 8 feet onto said removable first table of said bale wagon;

c. a removable second lifting means with a conveyor and a receiving and a discharge end, mountable on the forward end of the wheeled chassis of the bale wagon, with the receiving end of said conveyor positionable near ground level in the direction of travel, and with the discharge end at a second table on the wagon chassis, configured for contacting and lifting hay bales which are 3 feet by 3 feet by 8 feet or larger in dimension onto said second table of said bale wagon, in which said removable second lifting means may be mounted alternatively to said first lifting means;

d. a first table which is transverse to the long axis of the bale wagon, for receiving bales and accumulating bales which have dimensions less than 3 feet by 3 feet by 8 feet;

e. said second table which is located adjacent to the load bed, for accumulating hay bales into a horizontal layer;

f. said load bed configured for receiving a number of layers of hay bales accumulated on said second table and storing them in a vertical position, and configured for rotating the stack formed of layers from the second table onto an offloaded position, with said layers in a horizontal ordering; and g. a big bale attachment for the second table which is mountable on the second table and which comprises a reinforcing plate and a bale pushing blade, which pushes a big bale laterally on said second table, and a means of powering said bale pushing blade;

wherein said bale wagon system is configured for handling small bales by use of said first lifting means and said first table, and is configured for handling big bales with dimensions of at least 3 feet by 3 feet by 8 feet by use of said second lifting means and said big bale attachment to said second table.

2. The bale wagon system of claim 1 in which said second lifting means may be positioned in a raised transport position for ease of maneuvering of said bale wagon.

3. The bale wagon system of claim 1 in which said means of powering said bale pushing blade is a hydraulic system with one or more cylinders and a hydraulic motor, and hydraulic fluid.

4. The bale wagon system of claim 1 in which said big bale attachment to the second table further comprises a frame and floor mounted on the second table, of predetermined length and width of sufficient size so that two bales of at least 3 feet by 3 feet by eight feet which are delivered from said second lifting means may be placed side by side.

5. The bale wagon system of claim 1 in which said means for powering said bale pushing blade further comprises powered hydraulic means to pull a big bale horizontally across said second table.

6. The bale wagon system of claim 1 which further comprises a means for pivoting the second table which comprises a means for selectively pivoting the loading table between lowered and raised positions using extendable and retractable hydraulic cylinders having relatively moveable rod and barrel positions, to pivot the loading table ninety degrees whereby two big bales are delivered to said load bed from said second table.

7. The bale wagon system of claim 1 wherein said big bale attachment to said second table further comprises an elongated steel support joined normal to said front and said chassis members and sides.

8. A bale wagon system configured to load, transport and stack hay bales, said bale wagon system comprising:

a. a three table bale wagon with a removable first table, a second table, and a load bed, and a wheeled chassis with a forward and a rearward end and a longitudinal axis, for support and transport of bales;

b. a first lifting means with a conveyor, and a receiving and a discharge end, mountable on said forward end of said chassis of said three table bale wagon, and with said receiving end of said conveyor positionable near ground level in a direction of travel, and with said discharge end at said removable first table on said wagon chassis, configured for contacting and lifting hay bales which are less than 3 feet by 3 feet by 8 feet onto said first table of said bale wagon;

c. a second lifting means with a conveyor and a receiving and a discharge end, mountable on said forward end of said chassis of said bale wagon, with said receiving end of said conveyor positionable near ground level in a direction of travel, and with said discharge end at said second table on said wheeled chassis, for contacting and lifting hay bales which are 3 feet by 3 feet by 8 feet or larger in dimension onto said second table of said bale wagon, and positionable in a raised transport position for ease of maneuvering of said bale wagon;

d. a removable first table which is transverse to the long axis of the bale wagon, which is configured for receiving bales and accumulating bales which have dimensions less than 3 feet by 3 feet by 8 feet;

e. with said second table located adjacent to said first table, for accumulating hay bales into a horizontal layer;

f. with said load bed configured for receiving a number of layers of hay bales accumulated on said second table and storing them in a vertical position, and configured for rotating the stack formed of layers from said second table onto an offloaded position, with said layers in a horizontal ordering; and g. a big bale attachment to said second table which mounts on said second table and which comprises a frame and floor mounted on the second table, of predetermined length and width of sufficient size so that two bales of at least 3 feet by 3 feet by eight feet which are delivered from said second lifting means may be placed side by side, and further comprising a reinforcing plate and a bale pushing blade, which pushes a bale laterally on said second table, and a means of powering said bale pushing blade, comprising a hydraulic system with one or more cylinders and a hydraulic motor, and hydraulic fluid;

h. a means for pivoting said second table which comprises a means for selectively pivoting the second table between lowered and raised positions using extendable and retractable hydraulic cylinders having relatively moveable rod and barrel positions, to pivot the second table ninety degrees whereby two big bales are delivered to said load bed from said second table;

wherein said bale wagon system may be configured for handling small bales by use of said first lifting means and said removable first table, and may be configured for handling big bales with dimensions of at least 3 feet by 3 feet by 8 feet by installation and use of said second lifting means, and by installation of said big bale attachment to said second table.

9. A method for reversibly modifying a three table small bale stack wagon designed to load, transport, and stack small bales of less than 3 feet by 3 feet by eight feet, which includes a first lifting means with a discharge end, and a chassis with a forward end, and which is configured to lift said small bales from the ground and transporting small bales to a discharge end of the first lifting means, into a big bale stack wagon that loads, transports, and stacks big bales of greater than 3 feet by 3 feet by eight feet, comprising the steps of:

a. detaching from said three table small bale stack wagon said first lifting means;

b. mounting operatively a second lifting means to the forward end of said three table small bale stack wagon chassis, said second lifting means further having conveyor means with a discharge end for picking up big bales from the ground and transporting said big bales to said discharge end of said conveyor means;

c. mounting operatively a wheel apparatus to forward end of said conveyor having means for supporting said big bale conveyor apparatus in either a working or transport position;

d. mounting operatively an automatic hydraulic means for raising and lowering said big bale conveyor apparatus;

e. mounting to a second table of said three table small bale stack wagon a reinforcing means for strengthening said second table for mounting a big bale attachment to said second table attachment, for supporting the weight of big bales;

f. mounting a big bale attachment to the second table onto the upper surface of said second table of said three table small bale stack wagon, said big bale attachment having means to receive big bales, move them laterally on said second table, and transfer a row of big bales to a load bed of said small bale stack wagon;

g. installing operatively a big bale pushing blade with a means of powering said blade, for ordering big bales by lateral transport, and for accumulating big bales in a pair side by side on said second table, with said big bales having their longitudinal axis parallel to the longitudinal axis of said chassis, whereby the big bale pushing blade orders said big bales two at a time horizontally on the said table apparatus with the longitudinal axis of said big bales parallel to the longitudinal axis of said three table small bale stack wagon chassis by pushing said big bales from one side of said second table to the opposite side; and h. mounting a hydraulic means for raising and lowering said table apparatus loaded with said big bales to an underside of said second table of said three table small bale stack wagon, whereby two big bales can be raised vertically on end and ordered on to a load bed of said small bale stack wagon and arranged for transport and stacking.

10. A bale wagon system configured to load, transport and stack hay bales, said bale wagon system comprising:

a. a bale wagon with a second table, and a load bed, and a wheeled chassis with a forward and a rearward end and a longitudinal axis, for support and transport of bales;

b. a big bale lifting conveyor with a conveyor and a receiving end and a discharge end, mounted on said forward end of said wheeled chassis of said bale wagon, and configured with said receiving end of said conveyor positionable near ground level in a direction of travel, and with said discharge end at said second table on the wheeled chassis, for contacting and lifting big bales which are 3 feet by 3 feet by 8 feet or larger in dimension onto said second table of said bale wagon, and positionable in a raised transport position for ease of maneuvering of said bale wagon;

c. said second table being located adjacent to said discharge end of said big bale lifting conveyor, for accumulating hay bales into a horizontal layer;

d. a load bed configured to receive a number of layers of hay bales accumulated on said second table and storing them in a vertical position called a stack, and configured to rotate said stack formed of layers from said second table onto an offloaded position, with said layers in a horizontal ordering; and e. a big bale attachment to said second table which mounts on said second table and which comprises a frame and floor mounted on the second table, of predetermined length and width of sufficient size so that two bales of at least 3 feet by 3 feet by eight feet which are delivered from said big bale lifting conveyor may be placed side by side, and further comprising a reinforcing plate and a bale pushing blade, which pushes a bale laterally on said second table, and a means of powering said bale pushing blade, comprising a hydraulic system with one or more cylinders and a hydraulic motor, and hydraulic fluid; and f. a lifting arm for selectively pivoting said second table between a lowered and a raised position using extendable and retractable hydraulic cylinders having relatively moveable rod and barrel positions, to pivot the second table ninety degrees whereby two big bales are delivered to said load bed from said second table.

\* \* \* \* \*